United States Patent
Takemura

Patent Number: 5,920,358
Date of Patent: Jul. 6, 1999

[54] METHOD OF TRANSFORMING COLORS OF IMAGE

[75] Inventor: Kazuhiko Takemura, Kanagawa-ken, Japan

[73] Assignee: Fuji Photo Film Co., Ltd., Kanagawa-ken, Japan

[21] Appl. No.: 08/791,143

[22] Filed: Jan. 30, 1997

[51] Int. Cl.$^6$ .................................................. H04N 1/46
[52] U.S. Cl. ........................ 348/655; 348/661; 348/577; 348/645; 382/162; 382/167; 358/518; 358/520; 345/153; 345/154
[58] Field of Search .................... 348/656, 655, 348/661, 659, 577, 649, 645, 650, 603, 687; 382/162, 167; 358/518, 520; 345/153, 150, 154; H04N 1/46

[56] References Cited

U.S. PATENT DOCUMENTS

| | | | |
|---|---|---|---|
| 4,649,423 | 3/1987 | Hoffrichter et al. | 358/80 |
| 4,670,780 | 6/1987 | Mcmanus et al. | 358/80 |
| 4,694,286 | 9/1987 | Bergstedt | 340/703 |
| 4,709,230 | 11/1987 | Popowski et al. | 340/723 |
| 4,839,721 | 6/1989 | Abdulwahab et al. | 358/80 |
| 4,992,862 | 2/1991 | Gabor | 358/76 |
| 5,233,684 | 8/1993 | Ulichney | 395/131 |
| 5,416,890 | 5/1995 | Beretta | 395/131 |
| 5,420,704 | 5/1995 | Winkelman | 358/520 |
| 5,440,352 | 8/1995 | Deter et al. | 348/659 |
| 5,450,216 | 9/1995 | Kasson | 358/518 |
| 5,619,280 | 4/1997 | Yamashita et al. | 348/645 |
| 5,631,749 | 5/1997 | Ueda | 358/520 |
| 5,636,290 | 6/1997 | Kita et al. | 382/167 |
| 5,666,436 | 9/1997 | Eames | 382/167 |
| 5,668,890 | 9/1997 | Winkelman | 382/167 |
| 5,691,779 | 11/1997 | Yamashita et al. | 348/645 |
| 5,696,839 | 12/1997 | Siegeritz | 382/162 |
| 5,734,800 | 3/1998 | Herbert et al. | 395/109 |
| 5,751,845 | 5/1998 | Dorff et al. | 382/162 |
| 5,754,682 | 5/1998 | Katoh | 382/162 |
| 5,767,992 | 6/1998 | Tanaka et al. | 358/520 |
| 5,798,753 | 8/1998 | Zhou et al. | 345/153 |
| 5,801,855 | 9/1998 | Ohta | 358/518 |

Primary Examiner—John K. Peng
Assistant Examiner—Jean W. Désir
Attorney, Agent, or Firm—Sughrue, Mion, Zinn, Macpeak & Seas, PLLC

[57] ABSTRACT

Physiological primary colors, which correspond to tristimulus values of each of picture elements of an image on a hard copy, are obtained. A parameter, which represents the degree of incomplete chromatic adaptation, is determined in accordance with a correlated color temperature of a white point of a CRT display device, on which the image is to be displayed. Temporary tristimulus values, which are to be reproduced on the CRT display device, are derived in accordance with the parameter. From the temporary tristimulus values, perception values relating to lightness, color vividness and hue, such as metric lightness, metric chroma, and a metric hue angle in the LAB-color space are calculated by taking the white point of the CRT display device as a viewing illuminance. The tristimulus values of the image are then transformed into the tristimulus values on the display device, and a soft copy image is formed on the display device in accordance with the transformed tristimulus values. The same color appearances as those of the hard copy image are thereby obtained on the soft copy image displayed on the display device.

11 Claims, 2 Drawing Sheets

METHOD OF TRANSFORMING COLORS OF IMAGE

BACKGROUND OF THE INVENTION

1. Field of the Invention

This invention relates to a method of transforming colors of image such that the appearances of perceived colors may become identical between images, which are formed with devices, such as a color printer and a color display device, that have different correlated color temperatures of white points, different luminance levels, and the like, and which are viewed at different brightness levels of the surround.

2. Description of the Related Art

Images have heretofore been formed independently by various media, such as printing devices, photographic devices, and televisions, and used. However, with the rapid advances made in the information industry in recent years, there has arisen a tendency toward increased use of the so-called "media mix" techniques, with which the images are formed by transforming the image information between different media. Under such circumstances, the image readout, processing, and reproducing methods which are referred to as the "digital imaging techniques" became popular. Specifically, with the digital imaging techniques, the image information having been reproduced on a photograph is displayed on various kinds of display devices utilizing emitted light or transmitted light (various kinds of display systems utilizing phosphors, liquid crystals, plasmas, or the like), and the displayed image information is used. Also, for example, character patterns are added to the image having been reproduced on the display device, or a portion of the displayed image is altered or corrected. Further, an image having been formed on a display device is outputted to and reproduced by various kinds of printers (such as ink jet printers, sublimation types of printers, hot-melt types of printers, and printers utilizing silver halides), and the reproduced image is stored.

With the digital imaging techniques, images on hard copies, such as prints and photographs, are viewed as the images (hereinbelow referred to as the soft copies) formed on various different display devices. Therefore, as for a color image, the color appearances vary in accordance with the kind of the image recording or displaying medium. Accordingly, there is a strong demand for a technique for transforming the colors of an image such that the same color appearances can be obtained on every medium.

Specifically, ordinarily, a display image (i.e., a soft copy image) displayed on a CRT display device, or the like, and a hard copy image formed by a printer, or the like, differ markedly in the tint of the viewing illuminant, the brightness of the reference white, and the ambient conditions under which the image is viewed. For example, the white color of a CRT display device ordinarily has a correlated color temperature falling within the range of 6500K to 9300K, and an ordinary domestic fluorescent light has a correlated color temperature falling within the range of 4000K to 5000K. Also, hard copies are ordinarily viewed at a bright location, and soft copies are often viewed by setting the ambient light to be slightly dark. Further, soft copies are of the light emission colors, and therefore the color appearances given by the soft copies differ from the color appearances given by the reflecting materials, such as the hard copies.

As for how an image is to be transformed by considering the viewing conditions (such as the correlated color temperature of the white color, the luminance, and the ambient conditions) such that the same color appearances may be obtained when the image is viewed under certain conditions and when the image is viewed under different conditions, it has been proposed to employ transformation methods which are ordinarily referred to as the chromatic adaptation transformation or color appearance models. The transformation methods are described in, for example, Japanese Patent Publication Nos. 7(1995)-86814 and 7(1995)-86815; "Color Research and Application," Volume 19, Number 1, 1994, R. W. G. Hunt; "Color Research and Application," Vol. 20, No. 3, 1995, N. Nayatani; and "Color Research and Application," Vol. 16, No. 4, 1991, M. D. Fairchild.

However, the proposed models are based upon experimental results derived by using a single stimulus, such as a color patch or a color chip, and are not based upon image transformation between different media for processing a soft copy and a hard copy and for processing pictorial images. Further, the methods described in the Hunt's and Nayatani's literatures require very complicated calculations and very large amounts of calculations and are therefore not always appropriate for the applications of image transformation.

In cases where the aforesaid chromatic adaptation models or the color vision models are used, when a hard copy or a soft copy is viewed, it is basically necessary for the human visual system to be completely adapted to the white colors of the hard copy and the soft copy. However, when a soft copy image is compared with a hard copy image, the substantially adapting illuminant is not necessarily be the white color itself of the CRT display device. For example, the white color of a CRT display device having been set at a correlated color temperature of 5000K is ordinarily perceived as white slightly tinted with yellow, and the white color of a CRT display device having been set at a correlated color temperature of 9300K is ordinarily perceived as white slightly tinted with blue. The phenomenon indicates that the human visual system is not completely adapted to the white color of the CRT display device. The phenomenon is known as incomplete chromatic adaptation.

With respect to the incomplete chromatic adaptation, a suggestion is made in, for example, "Appearance Match between Soft Copy and Hard Copy under Mixed Chromatic Adaptation" by N. Katoh, Proceedings of the IS&T/SID 1995 Color Imaging Conference: Color Science, Systems and Applications. In the literature, it is suggested that, in order for the color appearances to be matched when an image on a CRT monitor is viewed under ambient lighting, good prediction can be made with respect to an adapting illuminance by carrying out a calculation in accordance with an RLAB color vision model (the Fairchild's method described above), in which a 6:4 internally dividing point between the chromaticity of the CRT monitor's white point expressed with the physiological primary colors and the point of the ambient lighting's white point expressed with the physiological primary colors is taken as the adapting white point. However, in the RLAB model, the effects of offsetting the tint of the illuminant (i.e., the effects of reducing the tint toward the equi-energy white color) are taken into consideration. Specifically, the internally dividing point between the point, which results from the subtraction of the tint of the illuminant, and the white color of the ambient lighting is taken as the adapting white point, and therefore problems occur. Also, it is known that, for example, as the surround becomes dark, a dark color is perceived as being comparatively bright, and the apparent contrast or the apparent color vividness becomes low. Therefore, a need exists for a simple image transforming method, with which the compensation for the effects occurring from the brightness of the surround can be made together with the aforesaid compensation for the chromatic adaptation.

SUMMARY OF THE INVENTION

The primary object of the present invention is to provide a method of transforming colors of image, wherein tristimulus values of an image on a color hard copy are transformed into tristimulus values on a display device, that utilizes emitted light or transmitted light, such that the same color appearances as the color appearances of the image on the color hard copy may be obtained on the display device, and wherein a soft copy image is formed on the display device and in accordance with the tristimulus values having been obtained from the transformation.

Another object of the present invention is to provide a method of transforming colors of image, wherein an adapting white point is set at a point, which is different from a white point itself of a display device, as a function of the color temperature of the white color of the display device only when the correlated color temperature of the white color of the display device is higher than 6000K or is lower than 5500K, and wherein ideal colors are thereby obtained on a wide variety of display devices.

A further object of the present invention is to provide a method of transforming colors of image, wherein a parameter is set for compensating for a reduction in contrast with respect to brightness only when the brightness of the surround around a CRT display device is dark, wherein a parameter is set for compensating for a reduction in color vividness perception only when the brightness of the surround around the CRT display device is dark, and wherein color appearances identical with the color appearances given by a hard copy can thereby be obtained on the display device even if the ambient conditions, under which the image on the display device is viewed, vary.

A still further object of the present invention is to provide a method of transforming colors of image, wherein calculations for color transformation are made with very simple formulas.

The present invention provides a method of transforming colors of image, comprising the steps of:

i) obtaining physiological primary colors, which correspond to tristimulus values of each of picture elements of an image on a hard copy, ii) determining a parameter, which represents the degree of incomplete chromatic adaptation, in accordance with a correlated color temperature of a white point of a display device, on which the image is to be displayed, iii) deriving temporary tristimulus values, which are to be reproduced on the display device, in accordance with the parameter, iv) calculating perception values relating to lightness, color vividness and hue from the temporary tristimulus values, the white point of the display device being taken as a viewing illuminance in the calculation, v) calculating lightness, which has been compensated for reduction in contrast with respect to the perception value relating to brightness, as a function of the illuminance of the surround at the time at which the image displayed on the display device is viewed, vi) calculating a chroma value, which has been compensated for reduction in contrast with respect to the perception value relating to color vividness, as a function of the illuminance of the surround at the time at which the image displayed on the CRT display device is viewed, and vii) calculating tristimulus values, which are ultimately presented to the CRT display device, in accordance with the lightness after being compensated, the chroma value after being compensated, and the perception value relating to hue.

Said white point of the display device is not limited strictly to one point but includes points around said one point which would provide substantially the same results.

The perception values relating to lightness, color vividness and hue may, for example, be metric lightness, metric chroma and a metric hue angle in the LAB-color space.

With the method of transforming colors of image in accordance with the present invention, even if the color temperature of the white color, the brightness of the white color, the brightness of the surround at the time at which the image displayed on the display device is viewed, or the like, varies, a soft copy image can be formed on the display device such that the soft copy image may give the same color appearances as the color appearances of the image of the color hard copy. In particular, transformation appropriate for various viewing conditions can be carried out easily on the elements of matrices by using the parameter which is set by considering incomplete chromatic adaptation, a parameter for compensating for reduction in the contrast with respect to brightness perception at the time at which the surround is dark, and a parameter for compensating for reduction in the color vividness perception.

DETAILED DESCRIPTION OF THE INVENTION

Figure 1:
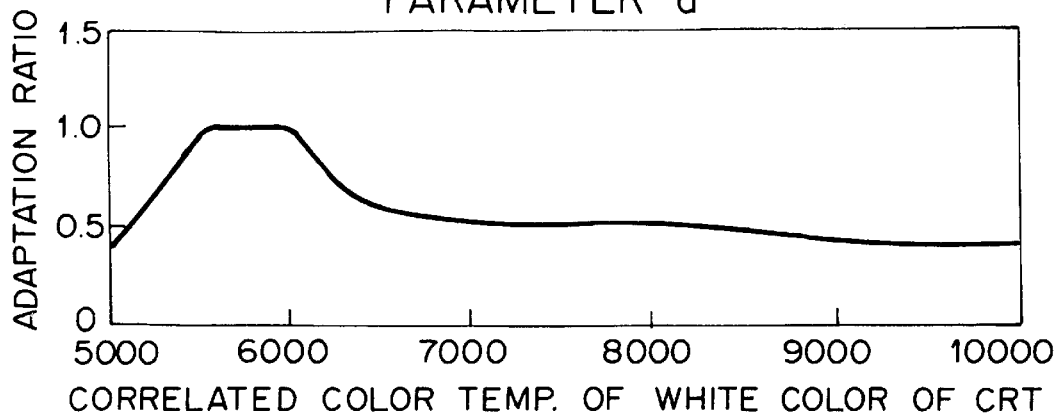
FIG. 1 is a graph showing a function of a parameter "a," which represents the relationship between a correlated color temperature of a white color of a CRT display device and an adaptation ratio in the method of transforming colors of image in accordance with the present invention.

The present invention will hereinbelow be described in further detail with reference to the accompanying drawings.

1) Chromatic adaptation transformation

The chromatic adaptation transformation is carried out with Formula (1) shown below on tristimulus values X, Y, and Z of each of picture elements of a hard copy image. Temporary tristimulus values X', Y', and Z', which are to be presented to a CRT display device, are thereby calculated.

$$\begin{vmatrix} X' \\ Y' \\ Z' \end{vmatrix} = |M|^{-1} \cdot |A| \cdot |M| \begin{vmatrix} X \\ Y \\ Z \end{vmatrix} \quad (1)$$

The matrix M serves to transform the tristimulus values into the stimulus values representing the physiological primary colors. By way of example, the matrix M may have the elements shown below.

$$|M| = \begin{matrix} 0.4002 & 0.7076 & -0.0808 \\ -0.2263 & 1.1653 & 0.0457 \\ 0.0 & 0.0 & 0.9182 \end{matrix} \quad (2)$$

2) Parameter "a" with respect to incomplete chromatic adaptation

The matrix A is a chromatic adaptation transformation matrix, which is set by considering incomplete chromatic adaptation. The matrix A is calculated with Formula (3) shown below by using a parameter "a", which is represented as a function of the color temperature of the white point of a CRT display device.

$$|A| = \begin{matrix} (a \cdot Ln_2 + (1-a) \cdot Ln_1)/Ln_1 \\ (a \cdot Mn_2 + (1-a) \cdot Mn_1)/Mn_1 \\ (a \cdot Sn_2 + (1-a) \cdot Sn_1)/Sn_1 \end{matrix} \quad (3)$$

In Formula (3), $Ln_1$, $Mn_1$, and $Sn_1$ are the chromaticity of the white color representing the illuminant, with which the hard copy is viewed, by the physiological primary colors. Also, $Ln_2$, $Mn_2$, and $Sn_2$ are the chromaticity representing the white color of the CRT display device by the physiological primary colors. Specifically, $Ln_1$, $Mn_1$, and $Sn_1$, as well as $Ln_2$, $Mn_2$, and $Sn_2$ are determined as shown below by using Formula (2) and from the chromaticity $(X_1, Y_1, Z_1)$ of the illuminant, with which the hard copy is viewed, and the chromaticity $(X_2, Y_2, Z_2)$ of the white point of the CRT display device.

$$\begin{matrix} Ln_1 & X_1 \\ Mn_1 = |M| & Y_1 \\ Sn_1 & Z_1 \end{matrix} \quad (4)$$

$$\begin{matrix} Ln_2 & X_2 \\ Mn_2 = |M| & Y_2 \\ Sn_2 & Z_2 \end{matrix} \quad (5)$$

The parameter "a" is represented by a function having been set such that the value of "a" may be equal to 1 when the correlated color temperature of the white color of the CRT display device falls within the range of 5500K to 6000K, and such that the value of "a" may monotonously become smaller than 1 as the correlated color temperature of the white color of the CRT display device becomes lower than 5500K or higher than 6000K. By way of example, the function of the parameter "a" is set as shown in FIG. 1. The parameter "a" should preferably have a value of 0.4 when the correlated color temperature is equal to 5000K and when the correlated color temperature is equal to 10000K.

3) Calculation of L*, A*, and B* values

The L*, A*, and B* values in accordance with the CIE 1976 L*A*B*-color space are calculated as shown below from X', Y', and Z' as well as $X_2$, $Y_2$, and $Z_2$.

$$L^* = 116(Y'/Y_2)^{1/3} - 16 \quad (6)$$

$$A^* = 500\{(X'/X_2)^{1/3} - (Y'/Y_2)^{1/3}\} \quad (7)$$

$$B^* = 200\{(Y'/Y_2)^{1/3} - (Z'/Z_2)^{1/3}\} \quad (8)$$

4) Metric hue angle H° and metric saturation s

The metric hue angle H° and the metric saturation s are defined as shown below with L*, A*, and B*.

$$H^\circ = \tan^{-1}(A^*/B^*) \quad (9)$$

$$C^* = (A^{*2} + B^{*2})^{1/2} \quad (10)$$

$$s = C^*/L^* \quad (11)$$

5) Parameter "b" with respect to brightness perception

A luminance ratio Yc to be reproduced on the CRT display device is calculated as shown below by using the parameter "b" in order to compensate for reduction in contrast with respect to the brightness perception in a dark surround.

$$Yc = 100 \cdot \{(L^* + 16)/116\}^{1/(3 \times b)} \quad (12)$$

Figure 2:
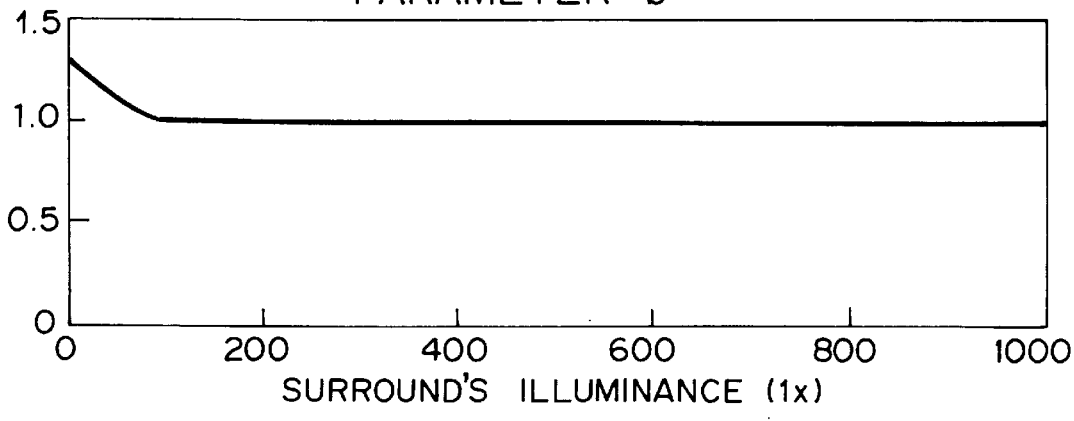
FIG. 2 is a graph showing a function of a parameter "b" for compensating for brightness perception with respect to the illuminance of the surround, in which an image displayed on a CRT display device is viewed, in the method of transforming colors of image in accordance with the present invention.

The parameter "b" is represented by a function having been set such that the value of "b" may be equal to 1 when the illuminance of the surround is higher than 100 lx, and such that the value of "b" may increase monotonously when the illuminance of the surround is lower than 100 lx. The parameter "b" should preferably have a value of 1.13 when the illuminance is 40 lx. By way of example, the function of the parameter "b" is set as shown in FIG. 2.

6) Corresponding chroma

Chroma Cc*, which has been compensated for reduction in the contrast in a dark surround, is calculated as shown below by using a parameter "c."

$$Cc^* = c \cdot C^* \quad (13)$$

Figure 3:
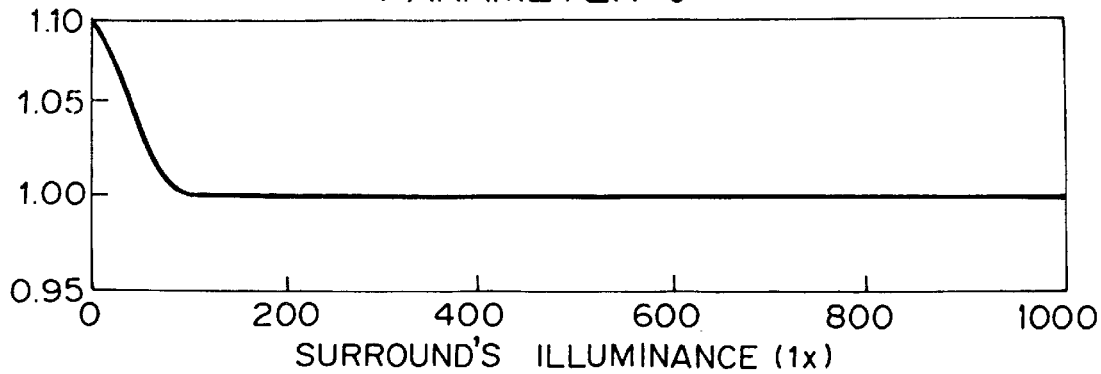
FIG. 3 is a graph showing a function of a parameter "c" for compensating for color vividness perception with respect to the illuminance of the surround, in which an image displayed on a CRT display device is viewed, in the method of transforming colors of image in accordance with the present invention.

The parameter "c" is represented by a function having been set such that the value of "c" may be equal to 1 when the illuminance of the surround is higher than 100 lx, and such that the value of "c" may increase monotonously when the illuminance of the surround is lower than 100 lx. The parameter "c" should preferably have a value of 1.06 when the illuminance is 40 lx. By way of example, the function of the parameter "c" is set as shown in FIG. 3.

The tristimulus values, which correspond to each of the picture elements of the image to be ultimately presented to the CRT display device, are calculated as shown below by using Yc of Formula (12), Formulas (7) and (8), and the parameter "c."

$$Xc = \{c \cdot A^*/500 + (Yc/Yn)^{1/3}\}^3 \cdot Xn \quad (14)$$

$$Zc = \{(Yc/Yn)^{1/3} - c \cdot B^*/200\}^3 \cdot Zn \quad (15)$$

Figure 4:
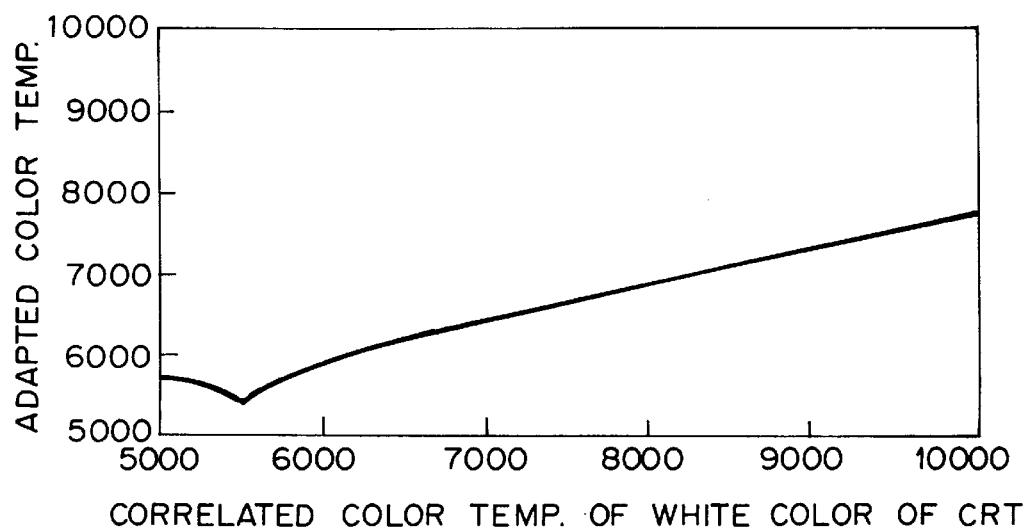
FIG. 4 is a graph showing the adapted color temperature which is a function of the correlated color temperature of the white point of the CRT display device.

In the embodiment described above, the elements of the matrix |A| are derived from the parameter "a" representing the degree of adaptation. Alternatively, the correlated color temperature of the white point, which is considered as being substantially adapting to the color temperature of the white point of the CRT display device, may be set in the form of a table or a function as shown in FIG. 4. Also, the chromaticity corresponding to the correlated color temperature of the white point, which is considered as being substantially adapting, may be derived from the chromaticity point of the daylight locus according to CIE and may thereby be calculated as shown below in lieu of Formula (3).

$$|A| = \begin{matrix} Ln_3/Ln_1 \\ Mn_3/Mn_1 \\ Sn_3/Sn_1 \end{matrix} \quad (16)$$

In Formula (16), $Ln_3$, $Mn_3$, and $Sn_3$ represent the values, which are expressed with the physiological primary colors in accordance with Formula (4) and which are obtained by transformation from coordinates $(x_3, y_3)$ of the chromaticity point of the daylight locus according to CIE, the chromaticity point having the same correlated color temperature as the correlated color temperature of the white point considered as being substantially adapting.

$$\begin{matrix} Ln_3 \\ Mn_3 = |M| \\ Sn_3 \end{matrix} \begin{matrix} X_3 \\ Y_3 \\ Z_3 \end{matrix} \quad (17)$$

wherein $X_3$, $Y_3$, and $Z_3$ are given as shown below.

$$X_3 = (x_3/y_3) * Y_3 \quad (18)$$
$$Y_3 = 100$$
$$Z_3 = \{(1 - x_3 - y_3)/y_3\} * Y_3$$

What is claimed is:

1. A method of transforming colors of image, comprising the steps of:
   i) obtaining physiological primary colors, which correspond to tristimulus values of each of picture elements of an image on a hard copy,
   ii) determining a parameter, which represents the degree of incomplete chromatic adaptation, in accordance with a correlated color temperature of a white point of a display device, on which the image is to be displayed,
   iii) deriving temporary tristimulus values, which are to be reproduced on the display device, in accordance with said parameter,
   iv) calculating perception values relating to lightness, color vividness and hue from said temporary tristimulus values, the white point of the display device being taken as a viewing illuminant in said calculation,
   v) calculating lightness, which has been compensated for reduction in contrast with respect to the perception value relating to brightness, as a function of the illuminance of the surround at the time at which the image displayed on the display device is viewed,
   vi) calculating a chroma value, which has been compensated for reduction in contrast with respect to the perception value relating to color vividness, as a function of the illuminance of the surround at the time at which the image displayed on the CRT display device is viewed, and
   vii) calculating tristimulus values, which are ultimately presented to the CRT display device, in accordance with said lightness after being compensated, said chroma value after being compensated, and said perception value relating to hue.

2. A method as defined in claim 1 wherein said perception value relating to lightness, color vividness and hue are metric lightness, metric chroma and a metric hue angle in the LAB-color space.

3. A method as defined in claim 1 wherein said parameter is a function of the color temperature of the white color of the display device and ensures that the adaptation becomes incomplete with respect to color temperatures, which are associated with correlated color temperatures higher than 6000K, and with respect to color temperatures, which are associated with correlated color temperatures lower than 5500K.

4. A method as defined in claim 1 wherein said lightness, which has been compensated for reduction in contrast with respect to perception value relating to brightness, is calculated with the function for transforming and reproducing such that, when the illuminance of the surround at the time, at which the image displayed on the CRT display device is viewed, is lower than 100 lx, the contrast of the perceived brightness may increase monotonously.

5. A method as defined in claim 1 wherein said chroma value, which has been compensated for reduction in contrast with respect to perception value relating to color vividness, is calculated with the function for transforming and reproducing such that, when the illuminance of the surround at the time, at which the image displayed on the CRT display device is viewed, is lower than 100 lx, the contrast of the perceived color vividness may increase monotonously.

6. A method of transforming colors of image, comprising the steps of:
   i) obtaining physiological primary colors, which correspond to tristimulus values of each of picture elements of an image on a hard copy,
   ii) determining a parameter, which represents the degree of incomplete chromatic adaptation, in accordance with a correlated color temperature of a white point of a display device, on which the image is to be displayed,
   iii) deriving temporary tristimulus values, which are to be reproduced on the display device, in accordance with the parameter;
   iv) calculating perception values relating to brightness, color vividness and hue from said temporary tristimulus values, the white point of the display device being taken as a viewing illuminant in said calculation; and
   v) calculating tristimulus values, which are ultimately presented to the display device, in accordance with said perception values relating to brightness, color vividness and hue.

7. The method of claim 6, further comprising, after the step of calculating said perception values:
   calculating lightness, which has been compensated for reduction in contrast with respect to the perception value relating to brightness, as a function of the illuminance of the surround at the time at which the image displayed on the display device is viewed, and
   calculating a chroma value, which has been compensated for reduction in contrast with respect to the perception value relating to color vividness, as a function of the illuminance of the surround at the time at which the image displayed on the CRT display device is viewed.

8. A method as defined in claim 7 wherein said perception value relating to lightness, color vividness and hue are metric lightness, metric chroma and a metric hue angle in the LAB-color space.

9. A method as defined in claim 7 wherein said parameter is a function of the color temperature of the white color of the display device and ensures that the adaptation becomes incomplete with respect to color temperatures, which are associated with correlated color temperatures higher than 6000K, and with respect to color temperatures, which are associated with correlated color temperatures lower than 5500K.

10. A method as defined in claim 7 wherein said lightness, which has been compensated for reduction in contrast with respect to perception value relating to brightness, is calculated with the function for transforming and reproducing such that, when the illuminance of the surround at the time, at which the image displayed on the display device is viewed, is lower than 100 lx, the contrast of the perceived brightness may increase monotonously.

11. A method as defined in claim 7 wherein said chroma value, which has been compensated for reduction in contrast with respect to perception value relating to color vividness, is calculated with the function for transforming and reproducing such that, when the illuminance of the surround at the time, at which the image displayed on the display device is viewed, is lower than 100 lx, the contrast of the perceived color vividness may increase monotonously.

* * * * *